United States Patent
Mangalath et al.

(10) Patent No.: US 10,217,458 B2
(45) Date of Patent: Feb. 26, 2019

(54) TECHNOLOGIES FOR IMPROVED KEYWORD SPOTTING

(71) Applicant: Intel Corporation, Santa Clara, CA (US)

(72) Inventors: Praful Mangalath, Mountain View, CA (US); Josef G. Bauer, Munich (DE); Georg Stemmer, Munich (DE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/274,498

(22) Filed: Sep. 23, 2016

(65) Prior Publication Data

US 2018/0090131 A1  Mar. 29, 2018

(51) Int. Cl.
*G10L 15/14* (2006.01)
*G10L 15/22* (2006.01)
*G06F 17/27* (2006.01)
*G10L 15/08* (2006.01)

(52) U.S. Cl.
CPC .......... *G10L 15/142* (2013.01); *G10L 15/22* (2013.01); *G06F 17/2705* (2013.01); *G10L 15/144* (2013.01); *G10L 2015/088* (2013.01)

(58) Field of Classification Search
CPC ..... G10L 15/142; G10L 15/22; G10L 15/144; G10L 2015/088; G06F 17/2705
USPC ........................................................ 704/256
See application file for complete search history.

(56) References Cited

U.S. PATENT DOCUMENTS

| 7,725,319 | B2 | 5/2010 | Aronowitz |
| 7,912,699 | B1* | 3/2011 | Saraclar .............. G10L 15/142 704/9 |
| 9,135,231 | B1* | 9/2015 | Barra .................... G06F 17/24 |
| 9,159,319 | B1 | 10/2015 | Hoffmeister |
| 2002/0013706 | A1 | 1/2002 | Profio |
| 2013/0204621 | A1 | 8/2013 | Rajput et al. |
| 2016/0336007 | A1* | 11/2016 | Hanazawa ........ G06F 17/30681 |
| 2017/0098442 | A1* | 4/2017 | Hoffmeister ............ G10L 15/02 |

FOREIGN PATENT DOCUMENTS

EP          2849178 A2    3/2015

OTHER PUBLICATIONS

International search report for PCT application No. PCT/US2017/047389, dated Nov. 23, 2017 (3 pages).
Written opinion for PCT application No. PCT/US2017/047389, dated Nov. 23, 2017 (7 pages).

* cited by examiner

*Primary Examiner* — Bharatkumar S Shah
(74) *Attorney, Agent, or Firm* — Barnes & Thornburg LLP

(57) ABSTRACT

Technologies for improved keyword spotting are disclosed. A compute device may capture speech data from a user of the compute device, and perform automatic speech recognition on the captured speech data. The automatic speech recognition algorithm is configured to both spot keywords as well as provide a full transcription of the captured speech data. The automatic speech recognition algorithm may preferentially match the keywords compared to similar words. The recognized keywords may be used to improve parsing of the transcribed speech data or to improve an assistive agent in holding a dialog with a user of the compute device.

25 Claims, 4 Drawing Sheets

TECHNOLOGIES FOR IMPROVED KEYWORD SPOTTING

BACKGROUND

Automatic speech recognition by a compute device has a wide variety of applications, including providing an oral command to the compute device or dictating a document, such as dictating an entry in a medical record. In some cases, keyword spotting may be required, such as if a piece of speech data is being searched for the presence of a specific word or set of words.

Keyword spotting is typically done by performing a speech recognition algorithm that is tailored to only match the keywords and to ignore or reject words outside of the keyword list. The output of a keyword spotter may only be the keywords that are matched, without any output provided for speech data that did not match the keywords.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
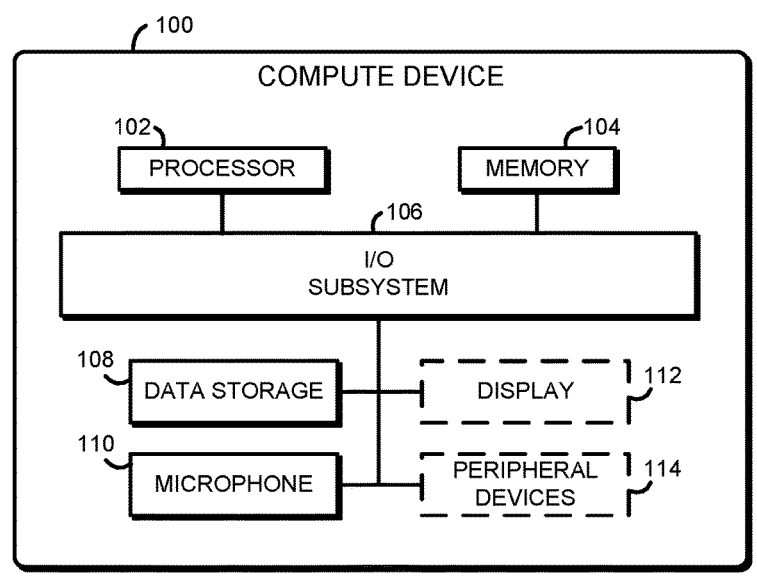
FIG. 1 is a simplified block diagram of at least one embodiment of a compute device for keyword spotting.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 includes a microphone 108, which is used to capture speech data from a user of the compute device 100. The compute device 100 performs an automatic speech recognition algorithm on the speech data using a statistical language model that has been modified to preferentially match words in a list of keywords. The output transcript of the automatic speech recognition algorithm includes all of the transcribed words in the speech data, including the words that are matched to a keyword as well as the words that are not matched to a keyword. The compute device 100 then takes an action based on the output transcript, such as by executing a command given by the user, parsing the output transcript based on a keyword, or determining an intent of the user based on a matched keyword.

The illustrative compute device 100 may be embodied as any type of compute device capable of performing the functions described herein. For example, the compute device 100 may be embodied as or otherwise be included in, without limitation, a smartphone, a cellular phone, a wearable computer, an embedded computing system, a System-on-a-Chip (SoC), a tablet computer, a notebook computer, a laptop computer, a server computer, a desktop computer, a handset, a messaging device, a camera device, a multiprocessor system, a processor-based system, a consumer electronic device, and/or any other computing device.

The illustrative compute device 100 includes a processor 102, a memory 104, an input/output (I/O) subsystem 106, data storage 108, and the microphone 110. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The microphone 110 may be embodied as any type of device capable of converting sound into an electrical signal. The microphone 110 may be based on any type of suitable sound capture technology such as electromagnetic induction, capacitance change, and/or piezoelectricity.

Of course, in some embodiments, the compute device 100 may include additional components often found in a compute device 100, such as a display 112 and/or one or more peripheral devices 114. The peripheral devices 114 may include a keyboard, a mouse, a communication circuit, etc.

The display 112 may be embodied as any type of display on which information may be displayed to a user of the compute device 100, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 2:
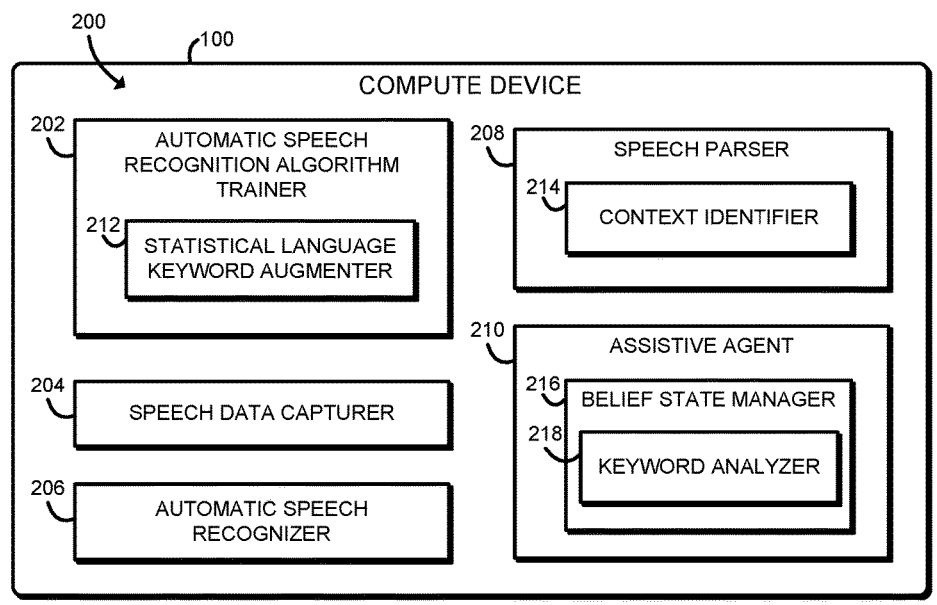
FIG. 2 is a block diagram of at least one embodiment of an environment that may be established by the compute device of FIG. 1.

Referring now to FIG. 2, in use, the compute device 100 may establish an environment 200. The illustrative environment 200 includes an automatic speech recognition algorithm trainer 202, a speech data capturer 204, an automatic speech recognizer 206, a speech parser 208, and an assistive agent 210. The various components of the environment 200 may be embodied as hardware, firmware, software, or a combination thereof. As such, in some embodiments, one or more of the components of the environment 200 may be embodied as circuitry or collection of electrical devices (e.g., an automatics speech recognition algorithm trainer circuit 202, a speech data capturer circuit 204, an automatic speech recognizer circuit 206, etc.).

It should be appreciated that, in such embodiments, the automatic speech recognition algorithm trainer circuit 202, the speech data capturer circuit 204, the automatic speech recognizer circuit 206, etc. may form a portion of one or more of the processor 102, the I/O subsystem 106, the microphone 110, and/or other components of the compute device 100. Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the processor 102 or other components of the compute device 100.

The automatic speech recognition algorithm trainer 202 is configured to train an automatic speech recognition algorithm. In the illustrative embodiment, the automatic speech recognition algorithm trainer 202 acquires labeled training data (i.e., training speech data with a corresponding transcript), which is used to train a hidden Markov model and generate an acoustic model. In some embodiments, the training data may be data from a particular domain, such as in a medical or legal field, and some or all of the keywords may correspond to terminology from that domain. The illustrative automatic speech recognition algorithm employs the acoustic model to match the speech data to phonemes, and also employs a statistical language model, which is used to match the speech data and corresponding phonemes to words based on a relative likelihood of the frequency of use of different sequences of words, such as different length n-grams (e.g., unigram, bigram, trigram, etc.). The illustrative statistical language model is a large-vocabulary language model, and may include more than, fewer than, or between any of 1,000, 2,000, 5,000, 10,000, 20,000, 50,000, 100,000, 200,000, 500,000, and 1,000,000 words. In the illustrative embodiment, the automatic speech recognition algorithm trainer 202 includes a statistical language keyword augmenter 214, which is configured to augment the statistical language model with a keyword language model, which uses a second hidden Markov model to match words in a list of keywords. The statistical language keyword augmenter 214 may augment the statistical language model by performing a linear interpolation between the statistical language model and the keyword language model. In the illustrative embodiment, the automatic speech recognition algorithm trainer 202 modifies the large-vocabulary language model to preferentially match the keywords over some similar words of the statistical language model when the speech data could reasonably match either one of the keywords or one of the words in the statistical language model. To do so, the automatic speech recognition algorithm trainer 202 weights the keywords higher than weightings of the corresponding words of the large-vocabulary language model. The keywords may include keyphrases, which are more than one word, and the automatic speech recognition algorithm may treat the keyphrases as a single word (even though they are more than one word). The number of keywords may be more than, fewer than, or between any of 1, 2, 5, 10, 20, 50, 100, 200, 500, 1000, 2000, and 5000 words or phrases.

In other embodiments, a different speech recognition algorithm may be used in place of or in addition to a hidden Markov model with a corresponding different speech recognition training process. For example, the speech recognition algorithm may be based on a neural network, including a deep neural network and/or a recurrent neural network. It should be appreciated that, in some embodiments, the compute device 100 may receive some or all of the parameters of the automatic speech recognition algorithm that has been trained by a different compute device, and need not perform some or all of the training itself.

The speech data capturer 204 is configured to capture speech data using the microphone 110. The speech data capturer 204 may capture speech data continuously, continually, periodically, or upon a command of the user, such as the user pressing a button to begin speech recognition.

The automatic speech recognizer 206 is configured to perform the automatic speech recognition algorithm that was trained by the automatic speech recognition algorithm trainer 202 on the speech data. The automatic speech recognizer 206 produces an output transcript for use by, e.g., an application of the compute device 100, which includes both the words that are present in the list of keywords as well as the words that are not present in the list of keywords. In the illustrative embodiment, the output transcript produced by the automatic speech recognizer 206 includes both the individual keywords that were matched as well as a separate complete transcript. In some embodiments, the output transcript may only include the transcribed text, without any particular indication of which words are keywords.

The speech parser 208 is configured to parse the output transcript to determine a semantic meaning based on the particular application. In some embodiments, the speech parser 208 may use the matched keywords to determine a context of a portion of the output transcript. For example, in one embodiment, a user may be dictating an entry into a medical record, and may say, "Prescribe 10 milliliters of Benadryl® to John Smith, insurance ID 7503986, claim ID 450934 under allergies dated Oct. 20, 2015." The keywords matched may be "prescribe," "insurance ID," and "claim ID." The speech parser 208 may use the matched keywords to determine a semantic context of each portion of the output transcription, and determine parameters of the medical entry, such as prescription (Benadryl®, 10 ml), insurance ID (7503986), claim ID (450934), etc.

The assistive agent 210 is configured to perform a dialog with a user of the compute device 100 to assist with certain tasks. The assistive agent 210 includes a belief state manager 216, which stores information related to the current state of the dialog between the user and the compute device 100, such as the current topic of discussion or the current intent of the user. The belief state manager 216 includes a keyword analyzer 218. When the output transcript matches a keyword, the keyword analyzer 218 can update the current belief state in response to matching the keyword, and may do so without waiting for the next transcribed word. In the illustrative embodiment, the keyword analyzer 218 may review previous transcriptions, and update and correct any ambiguities such as by reviewing a word lattice of the automatic speech recognition algorithm and searching for a match that may be a better fit based on the presence of the keyword.

Figure 3:
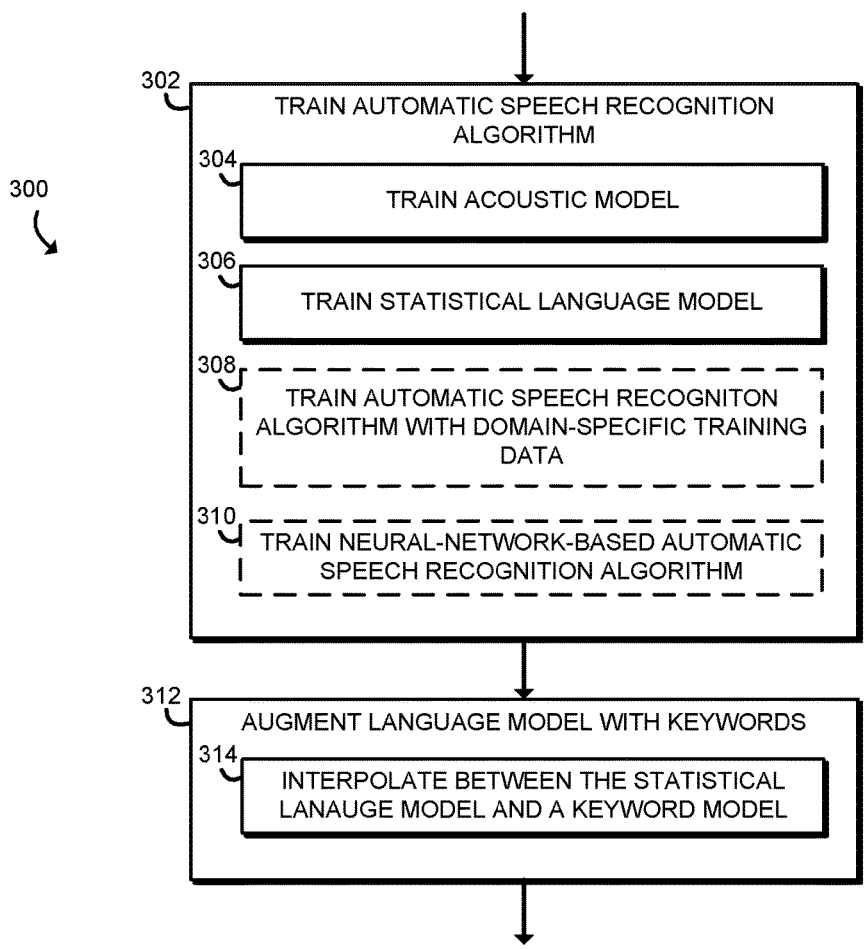
FIG. 3 is a simplified flow diagram of at least one embodiment of a method for training an automatic speech recognition algorithm for use in keyword spotting that may be executed by the compute device of FIG. 1.

Referring now to FIG. 3, in use, the compute device 100 may execute a method 300 for training an automatic speech recognition algorithm. The method 300 begins in block 302, in which the compute devices trains an automatic speech recognition algorithm. In the illustrative embodiment, the compute device 100 trains an acoustic model using a hidden Markov model in block 304, and trains a statistical language model in block 306. The training is done based on labeled training data. In some embodiments, the compute device 100 may train the automatic speech recognition algorithm with domain-specific training data, such as data from the medical or legal field, in block 308. In addition to or instead of training a hidden-Markov-model-based algorithm, the compute device 100 may in some embodiments train a neural-network-based automatic speech recognition algorithm in block 310.

In block 312, the compute device 100 augments the language model with keywords. In the illustrative embodiment, the compute device 100 does so by interpolating between the statistical language model and a keyword language model in block 314.

Figure 4:
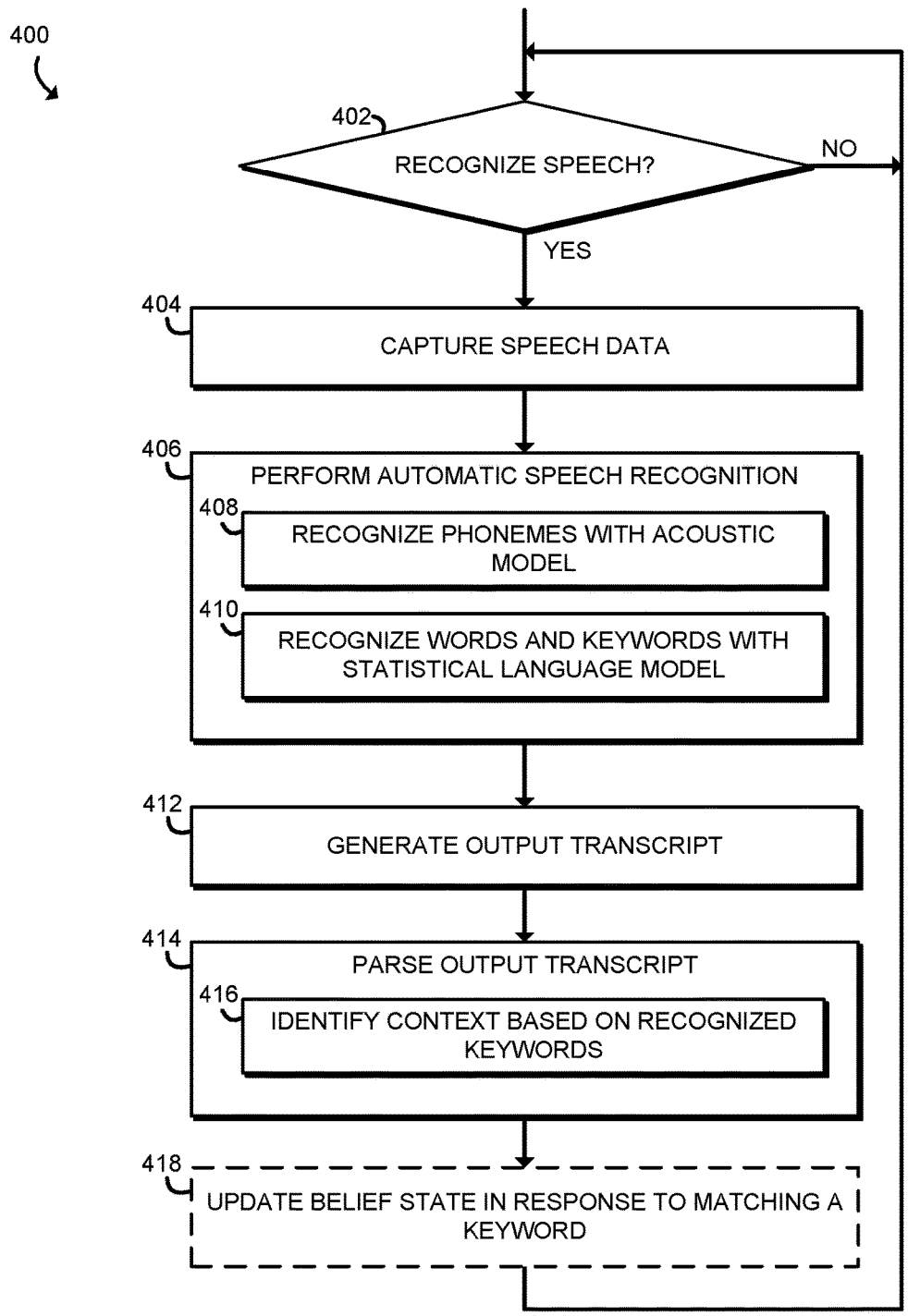
FIG. 4 is a simplified flow diagram of at least one embodiment of a method for automatic speech recognition with keyword spotting that may be executed by the compute device of FIG. 1.

Referring now to FIG. 4, in use, the compute device 100 may execute a method 400 for performing automatic speech recognition. The method begins in block 402, in which the compute device 100 decides whether or not to recognize speech. The compute device 100 may perform speech recognition continuously, continually, periodically, and/or when so instructed by a user of the compute device 100. In some embodiments, the compute device 100 may continuously monitor for the presence of speech using a speech detection algorithm, and perform speech recognition when the speech detection algorithm detects speech. If the compute device decides not to perform speech recognition, the method 400 loops back to block 402. If the compute device 100 decides to perform speech recognition, the method 400 proceeds to block 404.

In block 404, the compute device 100 captures speech data from the microphone 110. It should be appreciated that, in some embodiments, the speech data may instead be captured by a different compute device, and sent to the compute device 100 through some communication means, such as the Internet.

In block 406, the compute device 100 performs automatic speech recognition on the captured speech data. The compute device 100 recognizes phonemes of the speech data based on the acoustic model in block 408, and recognizes words and keywords based on the statistical language model in block 410.

In block 412, the compute device 100 generates an output transcript. In the illustrative embodiment, the output transcript includes both the individual keywords that were matched as well as a separate complete transcript. In some embodiments, the output transcript may only include the transcribed text, without any particular indication of which words are keywords. The output transcript can then be used by further processed or used by the compute device 100, such as by being provided to an application of the compute device 100.

In block 414, the compute device 100 parses the output transcript. In block 416, the compute device 100 identifies a context of a portion of the output transcript based on the recognized keywords.

In block 418, in some embodiments, the compute device 100 may update a belief state of an assistive agent in response to matching a keyword. In the illustrative embodiment, the compute device 100 may review transcriptions of previous dialog with the user, and update and correct any ambiguities such as by reviewing a word lattice of the automatic speech recognition algorithm and searching for a match that may be a better fit based on the keyword. In some embodiments, the compute device 100 may update the current belief state without waiting for the next transcribed word, even if the typical behavior of the compute device 100 is to wait for the next complete sentence, next silence, and/or the like before taking any action on the output transcription.

EXAMPLES

Illustrative examples of the devices, systems, and methods disclosed herein are provided below. An embodiment of the devices, systems, and methods may include any one or more, and any combination of, the examples described below.

Example 1 includes a compute device for automatic speech recognition, the compute device comprising an automatic speech recognition algorithm trainer to acquire a statistical language model for an automatic speech recognition algorithm, wherein the statistical language model comprises a large-vocabulary language model that has been modified to preferentially match words present in a plurality of keywords; a speech data capturer to receive speech data of a user of the compute device; and an automatic speech recognizer to perform an automatic speech recognition algorithm on the speech data to produce an output transcript, wherein the output transcript comprises one or more keywords of the plurality of keywords and one or more words not in the plurality of keywords.

Example 2 includes the subject matter of Example 1, and wherein the large-vocabulary language model that has been modified to preferentially match words present in the plurality of keywords comprises a first hidden Markov model to match words present in a large vocabulary and a second hidden Markov model to match words present in the plurality of keywords.

Example 3 includes the subject matter of any of Examples 1 and 2, and wherein weightings of the plurality of keywords are higher than corresponding weightings of the rest of the statistical language model such that the statistical language model preferentially matches the plurality of keywords.

Example 4 includes the subject matter of any of Examples 1-3, and wherein the statistical language model is formed by a linear interpolation of the large-vocabulary language model and a keyword language model.

Example 5 includes the subject matter of any of Examples 1-4, and wherein the plurality of keywords comprises fewer than fifty words and the large vocabulary comprises more than one thousand words.

Example 6 includes the subject matter of any of Examples 1-5, and wherein to receive the speech data comprises to capture the speech data with a microphone of the compute device.

Example 7 includes the subject matter of any of Examples 1-6, and further including a speech parser to identify, based on the one or more keywords, a context of a portion of the output transcript; and parse the output transcript based on the context of the portion of the output transcript.

Example 8 includes the subject matter of any of Examples 1-7, and wherein to acquire the statistical language model for the automatic speech recognition algorithm comprises to train a statistical language model for a large vocabulary and augment the statistical language model with a keyword language model such that the statistical language model preferentially matches the plurality of keywords.

Example 9 includes the subject matter of any of Examples 1-8, and wherein the statistical language model has been trained using domain-specific training data.

Example 10 includes the subject matter of any of Examples 1-9, and further including an assistive agent to update a belief state of the assistive agent in response to a match of the one or more keywords.

Example 11 includes the subject matter of any of Examples 1-10, and wherein to update the belief state in response to matching the one or more keywords comprises to update the interaction context without waiting for the next recognized word of the speech data.

Example 12 includes the subject matter of any of Examples 1-11, and wherein to update the belief state in response to matching the one or more keywords comprises to search a word lattice of the automatic speech recognition algorithm and to find a better match of the word lattice to the speech data based on the one or more keywords.

Example 13 includes the subject matter of any of Examples 1-12, and wherein at least one of the keywords of the plurality of keywords is a keyphrase comprising two or more words.

Example 14 includes a method for automatic speech recognition by a compute device, the method comprising acquiring, by the compute device, a statistical language model for an automatic speech recognition algorithm, wherein the statistical language model comprises a large-vocabulary language model that has been modified to preferentially match words present in a plurality of keywords; receiving, by the compute device, speech data of a user of the compute device; and performing, by the compute device, an automatic speech recognition algorithm on the speech data to produce an output transcript, wherein the output transcript comprises one or more keywords of the plurality of keywords and one or more words not in the plurality of keywords.

Example 15 includes the subject matter of Example 14, and wherein the large-vocabulary language model that has been modified to preferentially match words present in the plurality of keywords comprises a first hidden Markov model to match words present in a large vocabulary and a second hidden Markov model to match words present in the plurality of keywords.

Example 16 includes the subject matter of any of Examples 14 and 15, and wherein weightings of the plurality of keywords are higher than corresponding weightings of the rest of the statistical language model such that the statistical language model preferentially matches the plurality of keywords.

Example 17 includes the subject matter of any of Examples 14-16, and wherein the statistical language model is formed by a linear interpolation of the large-vocabulary language model and a keyword language model.

Example 18 includes the subject matter of any of Examples 14-17, and wherein the plurality of keywords comprises fewer than fifty words and the large vocabulary comprises more than one thousand words.

Example 19 includes the subject matter of any of Examples 14-18, and wherein receiving the speech data comprises capturing the speech data with a microphone of the compute device.

Example 20 includes the subject matter of any of Examples 14-19, and further including identifying, by the compute device and based on the one or more keywords, a context of a portion of the output transcript; and parsing, by the compute device, the output transcript based on the context of the portion of the output transcript.

Example 21 includes the subject matter of any of Examples 14-20, and wherein acquiring the statistical language model for the automatic speech recognition algorithm comprises training a statistical language model for a large vocabulary and augmenting the statistical language model with a keyword language model such that the statistical language model preferentially matches the plurality of keywords.

Example 22 includes the subject matter of any of Examples 14-21, and wherein the statistical language model has been trained using domain-specific training data.

Example 23 includes the subject matter of any of Examples 14-22, and further including updating, by an assistive agent of the compute device, a belief state of the assistive agent in response to matching the one or more keywords.

Example 24 includes the subject matter of any of Examples 14-23, and wherein updating, by the assistive agent, the belief state in response to matching the one or more keywords comprises updating, by the assistive agent, the interaction context without waiting for the next recognized word of the speech data.

Example 25 includes the subject matter of any of Examples 14-24, and wherein updating, by the assistive agent, the belief state in response to matching the one or more keywords comprises searching a word lattice of the automatic speech recognition algorithm and finding a better match of the word lattice to the speech data based on the one or more keywords.

Example 26 includes the subject matter of any of Examples 14-25, and wherein at least one of the keywords of the plurality of keywords is a keyphrase comprising two or more words.

Example 27 includes one or more computer-readable media comprising a plurality of instructions thereon that, when executed, causes a compute device to perform the method of any of Examples 14-26.

Example 28 includes a compute device for low-power capture of sensor values with high-accuracy timestamps, the compute device comprising means for acquiring a statistical language model for an automatic speech recognition algorithm, wherein the statistical language model comprises a large-vocabulary language model that has been modified to preferentially match words present in a plurality of keywords; means for receiving speech data of a user of the compute device; and means for performing an automatic speech recognition algorithm on the speech data to produce an output transcript, wherein the output transcript comprises one or more keywords of the plurality of keywords and one or more words not in the plurality of keywords.

Example 29 includes the subject matter of Example 28, and wherein the large-vocabulary language model that has been modified to preferentially match words present in the plurality of keywords comprises a first hidden Markov model to match words present in a large vocabulary and a second hidden Markov model to match words present in the plurality of keywords.

Example 30 includes the subject matter of any of Examples 28 and 29, and wherein weightings of the plurality of keywords are higher than corresponding weightings of the rest of the statistical language model such that the statistical language model preferentially matches the plurality of keywords.

Example 31 includes the subject matter of any of Examples 28-30, and wherein the statistical language model is formed by a linear interpolation of the large-vocabulary language model and a keyword language model.

Example 32 includes the subject matter of any of Examples 28-31, and wherein the plurality of keywords comprises fewer than fifty words and the large vocabulary comprises more than one thousand words.

Example 33 includes the subject matter of any of Examples 28-32, and wherein the means for receiving the speech data comprises means for capturing the speech data with a microphone of the compute device.

Example 34 includes the subject matter of any of Examples 28-33, and further including means for identifying, based on the one or more keywords, a context of a portion of the output transcript; and means for parsing the output transcript based on the context of the portion of the output transcript.

Example 35 includes the subject matter of any of Examples 28-34, and wherein the means for acquiring the statistical language model for the automatic speech recognition algorithm comprises means for training a statistical language model for a large vocabulary and means for augmenting the statistical language model with a keyword language model such that the statistical language model preferentially matches the plurality of keywords.

Example 36 includes the subject matter of any of Examples 28-35, and wherein the statistical language model has been trained using domain-specific training data.

Example 37 includes the subject matter of any of Examples 28-36, and further including means for updating, by an assistive agent of the compute device, a belief state of the assistive agent in response to matching the one or more keywords.

Example 38 includes the subject matter of any of Examples 28-37, and wherein the means for updating, by the assistive agent, the belief state in response to matching the one or more keywords comprises means for updating, by the assistive agent, the interaction context without waiting for the next recognized word of the speech data.

Example 39 includes the subject matter of any of Examples 28-38, and wherein the means for updating, by the assistive agent, the belief state in response to matching the one or more keywords comprises means for searching a word lattice of the automatic speech recognition algorithm and means for finding a better match of the word lattice to the speech data based on the one or more keywords.

Example 40 includes the subject matter of any of Examples 28-39, and wherein at least one of the keywords of the plurality of keywords is a keyphrase comprising two or more words.

The invention claimed is:
1. A compute device for automatic speech recognition, the compute device comprising:
an automatic speech recognition algorithm trainer to acquire a statistical language model for an automatic speech recognition algorithm, wherein the statistical language model comprises a large-vocabulary language model that has been modified such that the large-vocabulary language model preferentially matches words present in a plurality of keywords;
a speech data capturer to receive speech data of a user of the compute device;
and an automatic speech recognizer to perform the automatic speech recognition algorithm on the speech data to produce an output transcript, wherein the output transcript comprises one or more keywords of the plurality of keywords and one or more words not in the plurality of keywords.

2. The compute device of claim 1, wherein the large-vocabulary language model that has been modified to preferentially match words present in the plurality of keywords comprises a first hidden Markov model to match words present in a large vocabulary and a second hidden Markov model to match words present in the plurality of keywords.

3. The compute device of claim 2, wherein weightings of the plurality of keywords are higher than corresponding weightings of the rest of the statistical language model such that the statistical language model preferentially matches the plurality of keywords.

4. The compute device of claim 2, wherein the statistical language model is formed by a linear interpolation of the large-vocabulary language model and a keyword language model.

5. The compute device of claim 1, further comprising a speech parser to:
identify, based on the one or more keywords, a context of a portion of the output transcript; and parse the output transcript based on the context of the portion of the output transcript.

6. The compute device of claim 1, wherein to acquire the statistical language model for the automatic speech recognition algorithm comprises to train a statistical language model for a large vocabulary and augment the statistical language model with a keyword language model such that the statistical language model preferentially matches the plurality of keywords.

7. The compute device of claim 6, wherein the statistical language model has been trained using domain-specific training data.

8. The compute device of claim 1, further comprising an assistive agent to update a belief state of the assistive agent in response to a match of the one or more keywords.

9. The compute device of claim 8, wherein to update the belief state in response to matching the one or more keywords comprises to search a word lattice of the automatic speech recognition algorithm and to find a better match of the word lattice to the speech data based on the one or more keywords.

10. The compute device of claim 1, wherein at least one of the keywords of the plurality of keywords is a keyphrase comprising two or more words.

11. A method for automatic speech recognition by a compute device, the method comprising:
acquiring, by the compute device, a statistical language model for an automatic speech recognition algorithm, wherein the statistical language model comprises a large-vocabulary language model that has been modified such that the large-vocabulary language model preferentially matches words present in a plurality of keywords;
receiving, by the compute device, speech data of a user of the compute device; and
performing, by the compute device, the automatic speech recognition algorithm on the speech data to produce an output transcript, wherein the output transcript comprises one or more keywords of the plurality of keywords and one or more words not in the plurality of keywords.

12. The method of claim 11, wherein the large-vocabulary language model that has been modified to preferentially match words present in the plurality of keywords comprises a first hidden Markov model to match words present in a large vocabulary and a second hidden Markov model to match words present in the plurality of keywords.

13. The method of claim 12, wherein weightings of the plurality of keywords are higher than corresponding weightings of the rest of the statistical language model such that the statistical language model preferentially matches the plurality of keywords.

14. The method of claim 12, wherein the statistical language model is formed by a linear interpolation of the large-vocabulary language model and a keyword language model.

15. The method of claim 11, wherein acquiring the statistical language model for the automatic speech recognition algorithm comprises training a statistical language model for a large vocabulary and augmenting the statistical language model with a keyword language model such that the statistical language model preferentially matches the plurality of keywords.

16. The method of claim 11, further comprising updating, by an assistive agent of the compute device, a belief state of the assistive agent in response to matching the one or more keywords.

17. The method of claim 16, wherein updating, by the assistive agent, the belief state in response to matching the one or more keywords comprises searching a word lattice of the automatic speech recognition algorithm and finding a better match of the word lattice to the speech data based on the one or more keywords.

18. One or more non-transitory, computer-readable media comprising a plurality of instructions thereon that, when executed, causes a compute device to:
acquire a statistical language model for an automatic speech recognition algorithm, wherein the statistical language model comprises a large-vocabulary language model that has been modified such that the large-vocabulary language model preferentially matches words present in a plurality of keywords;
receive speech data of a user of the compute device; and
perform the automatic speech recognition algorithm on the speech data to produce an output transcript, wherein the output transcript comprises one or more keywords of the plurality of keywords and one or more words not in the plurality of keywords.

19. The one or more non-transitory, computer-readable media of claim 18, wherein the large-vocabulary language model that has been modified to preferentially match words present in the plurality of keywords comprises a first hidden Markov model to match words present in a large vocabulary and a second hidden Markov model to match words present in the plurality of keywords.

20. The one or more non-transitory, computer-readable media of claim 19, wherein weightings of the plurality of keywords are higher than corresponding weightings of the rest of the statistical language model such that the statistical language model preferentially matches the plurality of keywords.

21. The one or more non-transitory, computer-readable media of claim 19, wherein the statistical language model is formed by a linear interpolation of the large-vocabulary language model and a keyword language model.

22. The one or more non-transitory, computer-readable media of claim 18, wherein the plurality of instructions further causes the compute device to:
identify, based on the one or more keywords, a context of a portion of the output transcript; and
parse the output transcript based on the context of the portion of the output transcript.

23. The one or more non-transitory, computer-readable media of claim 18, wherein to acquire the statistical language model for the automatic speech recognition algorithm comprises to train a statistical language model for a large vocabulary and augment the statistical language model with a keyword language model such that the statistical language model preferentially matches the plurality of keywords.

24. The one or more non-transitory, computer-readable media of claim 18, wherein the plurality of instructions further causes the compute device to update a belief state of the assistive agent in response to a match of the one or more keywords.

25. The one or more non-transitory, computer-readable media of claim 24, wherein to update the belief state in response to matching the one or more keywords comprises to search a word lattice of the automatic speech recognition algorithm and to find a better match of the word lattice to the speech data based on the one or more keywords.

* * * * *